United States Patent
Erb

[15] 3,692,459
[45] Sept. 19, 1972

[54] PRODUCTION OF HEATED GASEOUS MATERIALS FROM CRYOGENIC LIQUIDS

[72] Inventor: George H. Erb, Cuttingsville, Vt.
[73] Assignee: America Velcro, Inc., Manchester, N.H.
[22] Filed: May 24, 1971
[21] Appl. No.: 146,192

[52] U.S. Cl. .................... 431/11, 60/36, 60/37, 431/2
[51] Int. Cl. .......................... F23d 11/44
[58] Field of Search ...... 60/36, 37; 431/2, 7, 11, 356; 126/263

[56] References Cited

UNITED STATES PATENTS

| | | |
|---|---|---|
| 3,101,592 | 8/1968 | Robertson et al. .......... 60/37 X |
| 3,418,804 | 12/1968 | Meijer et al. ............... 60/37 X |
| 3,471,274 | 10/1969 | Quigley et al. ............. 60/36 X |

Primary Examiner—Carroll B. Dority, Jr.
Attorney—James D. Bock

[57] ABSTRACT

Production of heated and/or pressurized gaseous products from a source of principal gas in liquefied form which contains oxygen such as liquid air and a separate source of liquefied fuel gas which consists at least in part of hydrogen in free or combined form. The liquefied principal and fuel gases are pumped as liquids at predetermined volumetric rates into heat exchanging means where they are vaporized. The vaporized gases are mixed in the heat exchanger or, when separate heat exchangers are used, the vaporized gases are subsequently mixed and passed over a catalyst to cause all of the hydrogen to combine with at least some of the oxygen to form water, in the form of water vapor, and heat, the heat thus produced being effective to raise the temperature of the entire volume of the mixed gases. The amount of hydrogen, having regard for the amount of oxygen in the mixture is so regulated, by control of the relative rates of pumping of the liquefied materials, that the mixture of gases is not combustible in the ordinary sense, that is the mixture cannot be ignited and will not support a self perpetuating flame at normal temperatures or at the temperature to which the mixture is heated by catalytic reaction. The energy contained in heated and/or pressurized gaseous product is utilized in any desired way, such as driving suitable engines, turbines or the like, or it may be utilized for heating of enclosed spaces.

7 Claims, 5 Drawing Figures

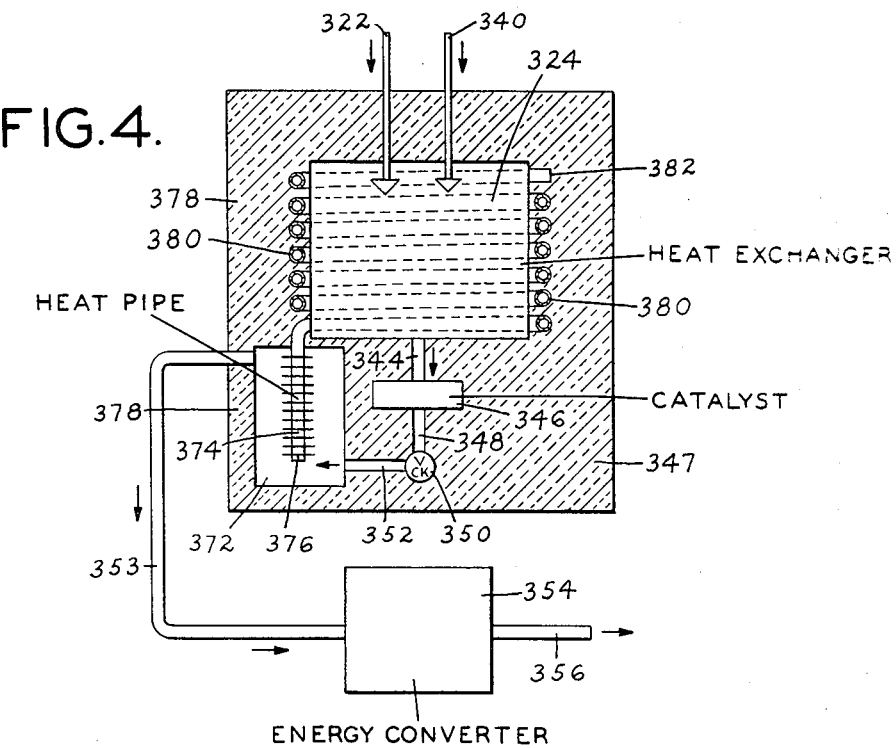

PRODUCTION OF HEATED GASEOUS MATERIALS FROM CRYOGENIC LIQUIDS

BACKGROUND OF THE INVENTION

The use of liquefied gas or mixtures of gas, including air, as a source of energy resulting from the controlled vaporization and consequent expansion of the liquid to gaseous form has been postulated from time to time in the past. However liquefied gases are much more commonly used as fuels or oxidants which, upon vaporization, are burned to develop elevated temperatures to produce desired quantities of heat energy.

In the Scientific American for Dec. 1, 1900 there is described on page 343 an automobile powered by the vaporization of liquid air. In the automobile there described an insulated tank of liquid air was connected to a heat exchanger, exposed to ambient atmosphere, in which the liquid air vaporized, expanded and developed a sufficient gaseous pressure to drive a reciprocating engine which originally had been designed for operation by steam. In that article it is stated that liquid air could be supplied at $0.15 per gallon and that approximately 10 gallons of liquid air would propel the extremely light-weight vehicle for a maximum distance of perhaps 50 miles. At the time this experimental automobile was presented and evaluated, liquid air as a source of power was in competition with the use of fossil fuels which in 1900 were enormously less expensive than they are in 1971. Also the vehicle was evaluated at a time when pollution of the atmosphere or depletion of fossil fuel supplies were of little concern to anyone. In Scientific American for Mar. 17, 1900 at page 163 an article written by Hudson Maxim presents a general and rather negative evaluation of liquid air against fuels and other materials under conditions then extant. As predicted in that article liquid air, up to the present time, has been most valuable as a source of oxygen. At the present time it is of interest to note that liquid air can be manufactured and sold at less than the 1900 price level whereby evaluation of this and similar liquefied gaseous materials must be made in the light of present costs of other energy sources and present demands for ecologically acceptable sources of power or heat including motive power for vehicles.

Also at the present time liquefied fuels as well as liquid oxygen and other gases are being very widely used in combustion and other chemical reactions in industry as well as in the powering of space vehicles. Also, compressed fuels and gases are in wide use and techniques and equipment for storing, handling and use of liquefied or compressed gases have been highly developed.

A very recent development in the use of compressed gaseous mixture has been made by the Rocketdyne Division of North American Rockwell Company. In this development an inert gas or mixture of inert gases has mixed therewith a relatively small quantity of a gaseous fuel such as hydrogen and a quantity of oxygen sufficient to combine with the hydrogen to form water. This mixture of gases is non-combustible and non-explosive in the ordinary sense, that is it cannot be ignited and thereafter produce a self perpetuating flame. It is compressed into bottles from which it may be valved through a suitable catalyst causing the hydrogen and oxygen to combine to form water and heat thus to raise the temperature and increase the rate of flow of the gas to a reaction motor. Temperatures as high as about 1500° F and expansion rates increased as much as three times can be achieved with readily available catalytic materials. This development has been adapted to small energy cells or engines or motors which have been found to be highly safe and reliable for attitude controls and the like in space craft. The hot expanded gaseous product emitted from motors embodying this development consist primarily of the original inert gas plus a relatively small amount of steam. The temperature developed by the catalystic reaction is dependent upon the amount of fuel gas and oxygen admixed with the inert gas, the amount of hydrogen gas for example may vary from as little as 2 ½ percent up to as high as 20 percent of the total gas mixture, although a mixture of 5 percent oxygen, 10 percent hydrogen and 85 percent nitrogen, by volume, will be heated to about 1500° F which is an upper limit for use with currently preferred catalysts.

The mixture of nitrogen, hydrogen and oxygen gases just described is not a mixture which is capable of liquefication because at the temperature to which hydrogen must be lowered to liquefy it the nitrogen and oxygen become solids. Therefore, the use of this and similar mixtures is restricted to operation from stored compressed gas and the several hundred fold reduction in volume of stored gas offered by liquefaction thereof cannot be availed of.

BRIEF DESCRIPTION OF THE INVENTION

The present invention provides method and apparatus for producing heated expanded or pressurized gas from at least two separate storage tanks containing cryogenic liquefied gases. The liquefied gases are drawn from the storage tanks and vaporized from liquid to gaseous form by heat exchange and are mixed in gaseous form in such proportions that the passage of the mixture of gases over a catalyst will result in heating and further expansion. To this end the liquefied gases must include suitable quantities of oxygen and hydrogen, or other fuel gas, to combine under catalystic action to form the required amount of water and heat. The heated gaseous product comprises a mixture of steam with the gases remaining after the catalytic reaction and it may be used in any manner in which such a heated gas may be useful.

As examples of use the mixture of heated gas and steam may be used as a power source for driving engines or motors which may include reciprocating pistons, turbine blades, gears or vanes. Also the heated gas may be used as a heat and gas distribution source for space heating, air conditioning or the like. In either event the invention is useful in any environment wherein space or weight factors or the demand for relatively or completely innocuous exhaust gases warrant the utilization of cryogenic liquefied gases as sources.

A preferred embodiment of the present invention involves the provision of one storage tank for a principal gas comprising liquefied gas or mixtures of gases having boiling points sufficiently close to one another as to render liquefaction thereof at cryogenic temperatures practical. For example such principal gas may be liquid nitrogen or other "inert" gas or gases mixed with oxygen, or it may be liquid air whether natural or rich or poor in oxygen. Another storage tank is provided for a supply of cryogenic liquefied fuel gas, for example liquefied hydrogen. The liquefied gases from the respective storage tanks are pumped by separate pumping devices at volumetric rates such as to constantly supply the amount of fuel gas and at least the amount of oxygen required for the catalytic heating reaction. The liquefied gases are sprayed in finely divided form through appropriate nozzles into a heat exchanger or into separate heat exchangers wherein the temperature of the sprayed liquids is raised to vaporization level for all of the gaseous elements. The gases may be mixed during vaporization in a common heat exchanger or may be mixed later when separate exchangers are used. The mixture of gases, with the hydrogen or other fuel content sufficiently low that the mixture is non-combustible in the ordinary sense at the temperature and pressure to be established in the following step, is then conducted through a suitable catalyst bed wherein the fuel gas and an appropriate portion, at least, of the oxygen present, combine to form water and heat. The heated mixture of gas or gases including steam is thereafter put to the intended use.

When, in this preferred embodiment liquid air is utilized as the principal gas, instead of an inert gas such as is used in the development described above, and hydrogen is used as the fuel gas the final heated and pressurized gas will be steam and air minus the amount of oxygen which combined catalytically with the hydrogen. Such final gas will be free of any noxious compounds but it would dilute natural ambient air into which it might be discharged or exhausted causing perhaps undesirable oxygen deficiency in the environment. A more specifically preferred embodiment of the present invention makes use of liquefied air enriched with just sufficient oxygen to combine with the specific amount of hydrogen used whereby the heated gas will be a mixture of steam and completely pollutant-free "air" with natural oxygen-to-nitrogen ratio. The advantages of use of this embodiment of the invention for driving prime movers of stationary or mobile type are very apparent.

It will be recognized that the proportionate amount of fuel gas that may be added to the mixture and thus the temperature to which the mixture may be heated by catalystic reaction is dependent upon the composition of the principal gas. When nitrogen or other "inert" gas is used as the principal gas a mixture of 85 percent nitrogen, 10 percent hydrogen and 5 percent oxygen may be formed which is non-combustible in the usual sense but which may be heated by catalytic reaction of all of the hydrogen and oxygen to about 1500° F as noted above. However, when air is used as the principal gas the mixture, because of the natural oxygen content of the air, cannot contain as much fuel gas and still remain non-combustible. For example the lower limit of flammability of a mixture of hydrogen and air or pure oxygen is a mixture containing about 4 percent hydrogen and 96 percent air or oxygen at standard temperature and pressure. Since the temperature to which a mixture of gases may be heated by this catalytic reaction is dependent upon the amount of fuel gas present it will be recognized that a mixture consisting principally of air or oxygen enriched air cannot be heated by this catalytic reaction, without burning, to temperatures as high as those to which more inert mixtures may be heated. Also, other factors such as catalyst life and the increased chemical activity of heated mixture high in oxygen suggest the advisability in many instances of only moderately elevating the temperature of such mixtures by this catalytic reaction. It is of particular interest in connection with the reduction in air pollution afforded by the present invention that the temperatures developed are far below the temperatures existing in internal combustion engines where temperatures in excess of 3000° F are common. The present invention operates far below any temperature at which reaction between oxygen and nitrogen proceeds at a rate sufficient to produce objectionable quantities of nitrogen-oxygen compounds. Also, when hydrogen, rather than hydrocarbons, is used as a fuel gas well-known air pollutants such as unburned hydrocarbons, partially burned hydrocarbons, sulfur compounds and the like will not be produced.

In structural embodiments of the present invention the liquefied principal gas and the liquefied fuel gas are pumped under positive pressure to the spray nozzles in the heat exchanger or exchangers in which they vaporize and expand to pressurized gaseous condition, the degree of pressure depending upon rate of infeed of liquefied components and the restriction placed upon escape from the chamber in which expansion occurs. For driving a motor considerable gaseous pressure may be desired whereas for heating a space a very low pressure may be desired. In some cases substantially all of the heat produced by the catalytic reaction may be exchanged back to the heat exchanger to accelerate the rate of vaporization of the liquefied components while in other instances a substantial portion of the heat may be permitted to remain in the pressurized gas for utilization as desired.

BRIEF DESCRIPTION OF THE DRAWINGS

FIGS. 2, 3, 4 and 5 are schematic illustrations respectively of separate modifications of a portion only of the embodiment shown complete in FIG. 1.

Figure 1:
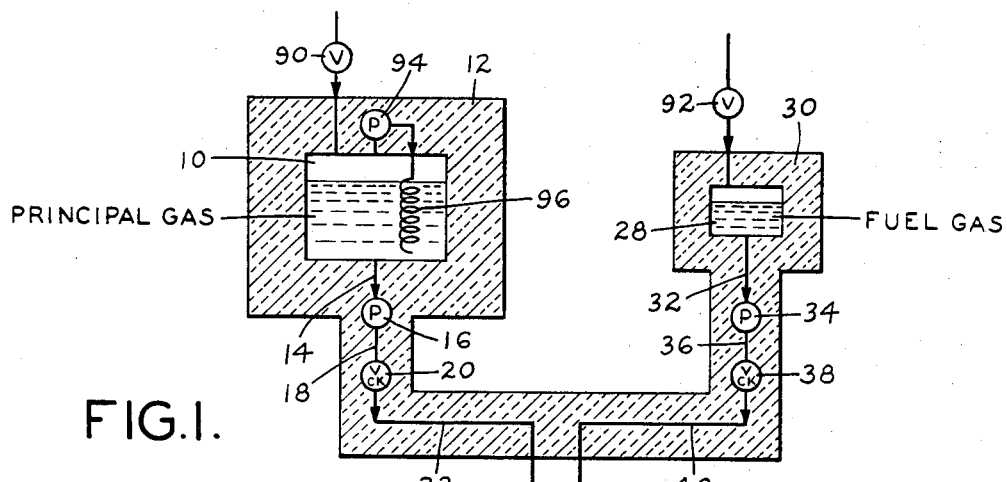
FIG. 1 is a schematic illustration of one embodiment of the present invention.

Referring now to the drawings:

In FIG. 1 there is shown in diagrammatic form a simple embodiment of the present invention. A supply or storage container 10 for the liquefied principal gas is enclosed in a body 12 of insulating material to afford thermal insulation against leakage of heat into the storage container 10. The insulating material 12 preferably also is at least sufficiently thick or effective to prevent the formation of frost on the exterior surface of the insulating material 12 and is sufficiently moisture vapor proof to prevent interior icing when the insulating material is exposed to an ambient atmosphere containing moisture vapor. A line 14 leads from the interior of the storage container 10 to a pump 16, preferably of the positive pressure type, which serves to remove liquefied gas from the container 10 at a constant predetermined rate to discharge it through a line 18 and a check valve 20 to line 22 which leads to a heat exchanger 24. The line 22 extends into the heat exchanger 24 and is provided with a spray nozzle 26 of suitable design to distribute the cryogenic liquefied material into the interior of the heat exhanger 24 in the form of a finely divided spray.

A second supply or storage container 28 is provided for the storage of liquefied fuel gas. The container 28 is enclosed within a suitable insulated body 30 affording both thermal and moisture vapor protection as discussed above in connection with the insulation of container 10. A line 32 extends from the interior of the container 28 to a pump 34, preferably of the positive pressure type, which serves to deliver liquefied fuel gas from the interior of the container 28 through a line 36 and check valve 38 to a line 40 which in turn leads to the interior of the heat exchanger 24. The line 40 is connected with a suitable spray nozzle 42 so chosen as to distribute the cryogenic liquid pumped from the container 28 in the form of a finely divided spray to become admixed with the finely divided spray supplied by the nozzle 26 within the heat exchanger 24.

The heat exchanger 24, while illustrated as a box in FIG. 1, may be of any suitable form for the exchange of heat with ambient atmosphere. Thus it will be realized that the heat exchanger 24 may be in the form of a finned radiator-like structure or coiled pipes or whatever may be suitable for use with the particular installation involved. For use in atmosphere of low relative humidity and where ready access is had to solar energy, as in a desert or in space for example, the heat exchanger 24 may be a relatively simple grid-like structure arranged for maximum exposure to ambient solar energy and little if any problems of frosting will be encountered. In normal atmospheres encountered on the earth wherein substantial quantities of moisture vapor are frequently present the heat exchanger will have to be so designed as to be readily defrostable or so as to be operative in spite of the accumulations of frost on portions thereof, all as is well known in connection with the commercial handling of extremely cold materials.

The mixture of gas supplied to the heat exchanger 24 by the nozzles 26 and 42 will vaporize within the heat exchangers and flow, under gaseous pressure determined by the rate of supply of the liquefied materials, through a line 44 to a catalyst bed 46. In accordance with the principles of the present invention, the mixture of gases will contain at least sufficient fuel gas and oxygen to combine catalytically as it passes through catalyst bed 46 to form water and thus to raise the temperature of the gaseous mixture to a desired level. For example if the principal liquefied gas being supplied to the apparatus consists of air or other mixtures containing nitrogen and oxygen and liquefied fuel gas is hydrogen these two liquids will be pumped by the pumps 16 and 34 respectively in such volumetric ratio that all of the vaporized hydrogen will combine catalytically with oxygen in the principal gas in the catalyst bed 46 to form water and heat. As noted above such a mixture of gases must be so regulated that it is not combustible in the ordinary sense. Therefore the rate of supply of the hydrogen must be limited according to the nature of the principal gas. The combined expansion resulting from vaporization of the liquefied gases in the heat exchanger 24 and of the heating thereof as they pass through the catalyst bed 46 will thus result in the production of relatively great volume of pressurized hot gas. Such hot gas will flow through a line 48 and check valve 50 to a line 52 leading to a device 54 for utilizing the energy, (heat and/or pressure), available in the hot gas. The spent gas will be exhausted from the device 54 through an exhaust line 56 for discharge to the ambient atmosphere or otherwise as may be desired.

The device 54 may be a heat exchanger, engine, turbine or other energy converting device as may be desired. The entire apparatus of FIG. 1 may be made as a stationary installation for the development of heat and/or power or it may be made as a portable installation. For example the apparatus may power a self propelled vehicle such as an automobile or boat or it may be a portable installation for the supply of auxiliary heat or power in a vehicle propelled by some other means.

Figure 2:
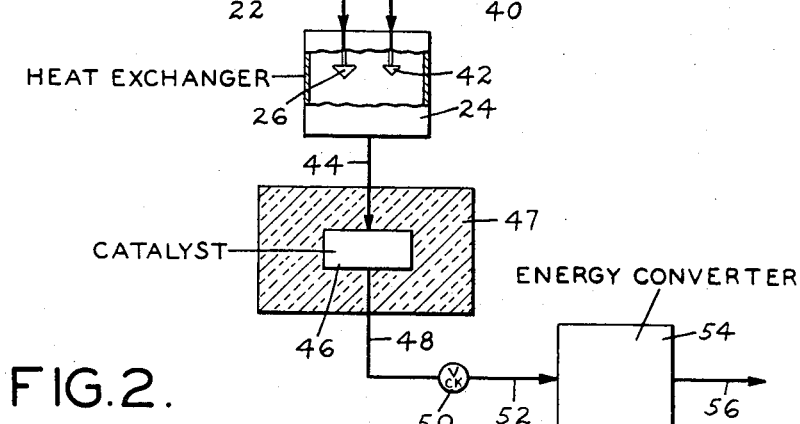

In FIG. 2 there is illustrated a modified portion of the apparatus which is shown complete in FIG. 1. In this FIG. 2 a heat exchanger 124 to which the liquefied principal gas is supplied through a line 122 and the fuel gas is supplied through a line 140 is arranged for heat exchange with an atmosphere other than the normal ambient atmosphere. The supply containers, pumps and other equipment such as spray nozzles may be the same as that illustrated in FIG. 1. The vaporized mixture of gases in FIG. 2 leave the heat exchanger 124 through line 144 and passes through a catalyst bed 146 for reaction and heating and it is discharged through a line 148 and check valve 150 to a line 152. The line 152 conducts a portion of the heated expanded gaseous mixture to a device 154 corresponding with the device 54 in FIG. 1 for utilization of the energy of heat and/or pressure. Spent gas exhausts through a line 156. A branch line 158 is connected from the line 152 through an adjustable valve 160 to a line 162 which leads into a jacket 164 enclosing the heat exchanged 124. The hot gases thus diverted at a controlled rate by valve 160 are permitted to circulate around the heat exchanger 124 for the purpose of rapidly advancing the vaporization of the liquefied materials sprayed into the heat exchanger 124. After giving up a portion of the heat the relatively cooler gas leaves the jacket 164 through a discharge line 166. The line 166 may be connected with a device 168 for utilizing any residual energy (heat and/or pressure) which may be available in the relatively cooler gas. The spent gas is eventually discharged through an exhaust 170.

The advantage of the modification shown in FIG. 2 over that shown in FIG. 1 is that the apparatus of FIG. 2 may be used in ambient atmospheres irrespective of the moisture content, temperature or the like thereof since the heated gas coming from the catalyst bed 146 may be diverted in sufficient quantity to insure that the exterior surface of the jacket 164 will remain above any temperature at which freezing becomes a problem. Also, of course, the jacket 164 preferably will be so arranged as not to result in waste of heat energy or possible danger to personnel. This may require thermal insulation of all or a part of the exterior surface of the jacket 164.

Figure 3:
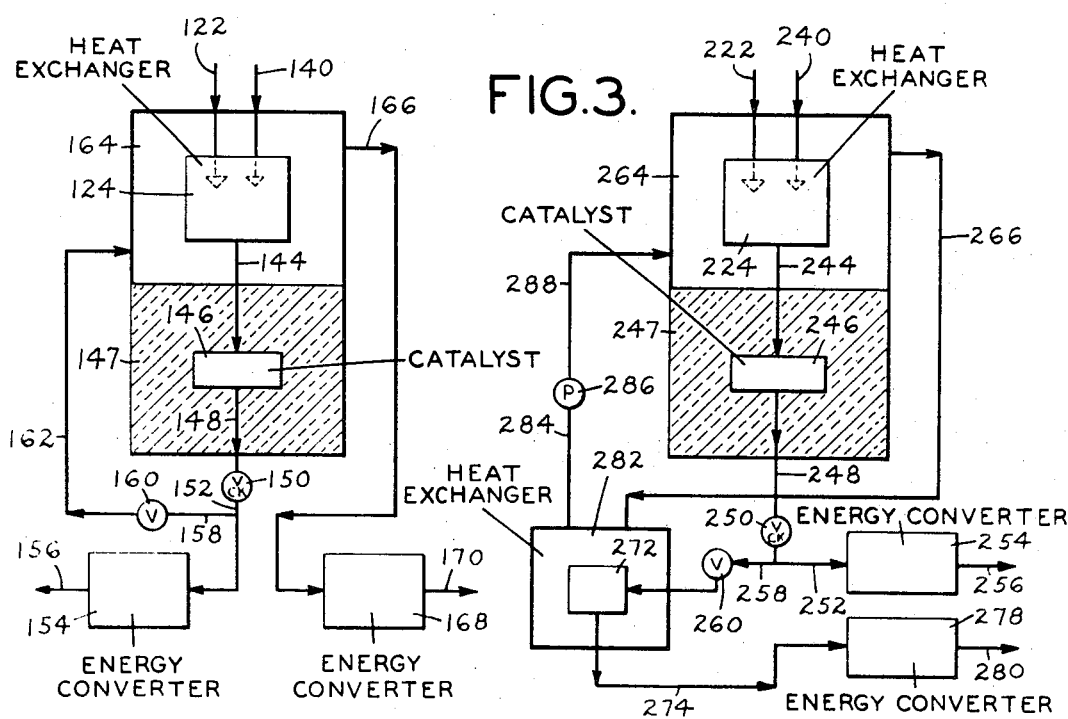

In FIG. 3 a still further modification of a part of the apparatus illustrated in FIG. 1 is shown. Here again the supply or storage containers, pumps, spray nozzles and the like may be the same as illustrated in FIG. 1. Thus in FIG. 3 a heat exchanger 224 is enclosed with a jacket 264 and the liquefied principal gas is supplied to the heat exchanger 224 through a line 222 and the liquefied fuel gas is supplied thereto through a line 240. The vaporized mixture of gases leaving the heat exchanger 224 go through a line 244 to a catalyst bed 246 and the heated expanded gases go through a line 248 and check valve 250 to a device 254 which utilizes energy available in the heated pressurized gas. The device 254 discharges spent gas through an exhaust 256. A branch line 258 having an adjustable valve 260 therein leads from the line 252 to conduct a predetermined portion of the pressurized heated gas from the line 252 to an interior chamber 272 of a secondary heat exchanger and from the interior of that secondary heat exchanger to a line 274 to a device 278 for utilizing energy remaining in the gas. The spent gas is exhausted from the device 278 through an exhaust line 280.

The interior chamber 272 of the secondary heat exchanger just described is surrounded by a jacket 282 which in turn is filled with a heat exchanging fluid such as a liquid or a gas or mixture of gases. The fluid within the jacket 282 will be heated by the hot gases passing through the interior chamber 272 and such heated fluid is removed from the jacket 282 through a line 284 and pump 286 to be forced under desired pressure and at a desired rate through a line 288 into the jacket 264 surrounding the primary heat exchanger 224. The heated gas thus entering the jacket 264 will transfer heat to the heat exchanger 224 to accelerate the vaporization of the liquefied gases supplied thereto through the line 222 and 240. The relatively cold heat exchanging fluid leaves the jacket 264 through a line 266 and is returned to the jacket 282 surrounding the inner chamber 272 of the heat exchanger. Thus there is provided a closed circuit for the circulation of a heat transfer fluid to transfer a part of the heat developed in the catalytic reaction for the purpose of vaporizing the liquefied gases coming from the supply tank.

The fluid thus circulated in the closed circuit shown in FIG. 3 may be air but preferably it is a gas devoid of moisture vapor and one which has been selected for efficient transfer of heat. In some instances the recirculated fluid may be a suitable liquid having sufficiently low freezing point to make its use practical. For example brine, ethylene glycol or a mixture of ethylene glycol and water may be used.

In FIG. 4 a still further modification is illustrated. In this embodiment use is made of the well-known "heat pipe" for transfer of heat from the pressurized heated gaseous product of the catalytic reaction backwardly to the primary heat exchanger in which the liquefied gas infeed is vaporized.

In FIG. 4 the liquefied principal gas is supplied through line 322 to the interior of heat exchanger 324 where it is distributed in finely divided form by nozzles as described above in connection with FIG. 1. The liquefied fuel gas is similarly supplied through a line 340 and is sprayed into the interior of the heat exchanger 324. As in the preceding embodiments the mixture of vaporized gases leaves the heat exchanger 324 through a line 344 and flows through a catalyst bed 346 where reaction occurs and the pressurized heated gas then flows through a line 348, check valve 350 and line 352. The gas then enters chamber 372, flows through it and out through a line 353 to a device 354 which utilizes energy available in the pressurized heated gas. The device 354 is provided with an exhaust 356 for the spent gas.

Positioned within chamber 372 in FIG. 4 there is one closed end of a heat pipe 374 having fins 376, if so desired, and which is exposed to the flow of pressurized heated gas through chamber 372. The closed heat pipe 374 contains a quantity of suitable liquid in a vacuum which will vaporize at the temperatures encountered in chamber 372 and the vapor will conduct heat at a very rapid rate to the portions of the heat pipe outside the chamber 372. Thus, the heat pipe 374 extends preferably covered by thermal insulative material 378 to the exterior surface of the heat exchanger 324 where it is wrapped in a helical coil having turns 380 surrounding the heat exchanger 324. The heat pipe 374 terminates in a closed end 382. As is well known, the heat pipe 372 also contains a suitable form of "wick" which may be a fibrous or a woven structure of yarns, wire or the like. Thus, the hot vapor rising in the heat pipe 374 will lose heat to the heat exchanger 324 and will condense to liquid form in the region of the closed end 382 and will be wicked back to the lower, or hot, end of the heat pipe 374 to be reheated and vaporized within chamber 272.

In FIG. 5 a further modification utilizing a heat pipe is illustrated. As shown in FIG. 5 liquefied principal gas is supplied through a line 422 to be sprayed into the interior of a chamber 424. Liquefied fuel gas is supplied through a line 440 to be sprayed into the interior of chamber 424. In this particular embodiment of the invention the chamber 424 performs little, if any, function as a heat exchanger but rather serves as a mixing chamber for the finely divided droplets of principal gas and fuel gas supplied through lines 422 and 440 under positive pressure from pumps (16 and 34 of FIG. 1) which are not shown in FIG. 5. The mixed spray droplets then flow into a line 444 which is enclosed in concentric fashion within a heat pipe 474 the upper closed end 482 of which terminates at the adjacent wall of chamber 424. The nested concentric line 444 and pipe 474 has a considerable length which conveniently may be coiled (not shown) in the space indicated by the break lines in FIG. 5.

The line 444 continues, in the lower portion of FIG. 5, to conduct vaporized gas to a catalyst bed 446 where the gas is heated and pressurized by catalytic reaction to flow through line 448, check valve 450 and line 452 to a chamber 472. From chamber 472 the heated pressurized gas flows through a line 453 to a device 454 which utilizes energy available in such gas. From device 454 the spent gas is exhausted through line 456.

The heat pipe 474, as shown in the lower portion of FIG. 5, branches away from line 444 at a sealed joint 484 and extends into the chamber 472. The closed end of heat pipe 474 may be provided with fins 476, if desired, and is so positioned in the chamber 472 as to be heated by the hot pressurized gas flowing through that chamber.

The heat pipe 474, like the pipe 374 in FIG. 4, follows well-known design and contains a quantity of vaporizable liquid in a vacuum and a wick means for the rapid and efficient transfer of heat from chamber 472 to the exterior of the length of line 444 that is enclosed within heat pipe 474.

Referring back to FIG. 1 certain practical aspects of mechanical installation and of manipulation and control procedures will be discussed. If the apparatus of FIG. 1, with or without the modifications in FIGS. 2 through 5, is to be installed in a vehicle, for example an automobile, it will be apparent that the supply or storage containers 10 and 28 for the liquefied gaseous materials must be baffled to reduce surging of the liquids much as is the case with conventional gasoline tanks in gasoline propelled vehicles. Also, the supply or storage containers 10 and 28 must be shaped or subdivided for efficient positioning in the vehicle package.

The supply or storage tanks 10 and 28 in any sort of installation preferably will be provided with certain safety features among which is included a safety valve 90 for tank 10 and a safety valve 92 for tank 28. These valves may be set to release gaseous vapors at some moderate pressure since, particularly during periods of non-use, inevitable heat leakage will cause progressive vaporization and pressure increase in the tanks. The valves 90 and 92 also may be so designed as to permit refilling of the tanks 10 and 28 from suitable pressurized sources of liquefied gaseous materials.

In any installation, whether portable or stationary, the principal liquefied gas stored in tank 10 usually will comprise a mixture of gases having different boiling points. For example if the mixture contains oxygen and nitrogen the nitrogen will vaporize at a lower temperature than the oxygen and the tendency, under heat leakage conditions, will be for the liquefied mixture to progressively become richer in oxygen when there is a head space above the liquid in the tank. To reduce the consequences of such selective vaporization the supply or storage container 10 may be provided with a power driven pump 94 having the suction side communicating with the head space above the liquid in container 10 and having the pressure side connected with a coiled tube 96 extending downwardly through the liquid and opening into the liquid at a level well below the surface. The gas in the head space thus is recirculated by the pump 94 to be cooled in the coil 96 and to condense or to bubble upwardly through the liquid. For stationary installations the operation of the pump 94 and coil 96 will serve to reduce thermal stratification in the body of the liquid and to reduce the rate of selective vaporization of the constituents of the liquefied gaseous mixture.

In many installations where a substantially constant power demand is made upon the system of the present invention the pumps 16 and 34 (FIG. 1) may be set to operate at a predetermined steady rate and the heated and pressurized gaseous product may be delivered directly to the energy converting elements of the device 54. It will be recognized that progressive depletion of the supplies of liquefied gaseous materials in the containers 10 and 28 will have no effect upon energy output since the latter will depend directly upon the rate at which the liquefied materials are delivered to the heat exchanger 24 by positive pressure pumps 16 and 34.

When the energy converting device, 54 of FIG. 1 or the corresponding devices shown in FIGS. 2 through 5, is to be subjected to widely varying power demand, as it would be in the propelling of an automobile for example, any of several control procedures may be adopted depending upon choice as well as the type of energy converter in use. The rates of operation of pumps 16 and 34 may be varied, in a fixed ratio, in response to power demands. Alternatively the pumps may be operated at steady rates to be cut into and out of operation in response to gaseous pressure in an accumulator tank (not shown) forming a part of the energy conversion device. In such event the pressurized heated gas will be delivered from the accumulator to the energy conversion elements of device 54, for example, through a suitable throttle valve or the like. In other instances a throttle valve as just described may be ganged with speed controls for the pumps 16 and 34 so as to increase or decrease the rate of supply of pressurized heated gas to the accumulator in accordance with demand as signaled by the position of the throttle valve. Obviously the accumulator need not be maintained at a constant pressure in any installation where the variations in power demand would be better satisfied by varying the pressure. For example the speed controls for the pumps 16 and 34 may be so arranged as to strive to maintain a predetermined minimum pressure in the accumulator at all times, including at least some standby periods of no power demand, and, normally, to cut off at any time such minimum pressure exists. However, when predetermined large power demand is placed on the system the normal cut off system is overridden and the pump speeds may be increased to supply the liquefied gaseous materials at such rates as to raise the pressure in the accumulator to any desired point up to some predetermined maximum pressure possibly selected for safety reasons.

The catalyst bed 46 in FIG. 1 has been shown enclosed in a thermally insulative body 47 and similar bodies 147, 247, 347 and 447 have been shown respectively in FIGS. 2, 3, 4 and 5. Such enclosure is desirable to conserve heat, when this is required, but also in view of the temperatures developed in the catalyst bet it may be desirable to protect users from injury. While it has not been shown in the drawings it will be apparent that any lines such as 48 and 52 in FIG. 1 which conduct the heated pressurized gas usually should be insulated and protected for similar reasons.

In any installation in which the system is shut down for substantial periods of time between periods of use it may be desirable to provide preheating means (not shown) at certain points. For example a preheater may be provided for the heat exchanger to insure rapid vaporization of sufficient quantities of the liquefied gases to shorten startup time. Similarly, in some cases it may be desirable to provide preheating means for the catalyst bed. Such preheating means in either case may be electrical resistance heaters, fuel-fed heaters or the like and they may be manually controlled or automatically programmed as desired.

It will be recognized that from the standpoint of cost of operation the heat required for vaporization of the liquefied principal and/or fuel gases should be derived as much as possible from ambient atmosphere and from direct solar radiant energy when available. The apparatus shown in FIG. 1 depends entirely on such sources of heat since the heat exchanger 24 is of the type which is exposed to ambient atmosphere and/or to the sun, where possible. For example when the system is used to propel an automobile, bus or truck the heat exchanger may have quite large areas exposed by placing it on the exterior of the roof of the vehicle. For stationary installations the heat exchanger usually may be placed on the roof of an enclosing structure.

The systems shown in FIGS. 2 through 5 in all but those rare instances where it may be impossible or impracticable, should be associated with an atmospheric and/or solar heat exchanger to assist in vaporization of the liquefied gaseous materials in the heat exchanging system. In view of the great amount of heat usually available from the atmosphere and from the sun the recycling systems of FIGS. 2 through 5 preferably should be used alone only when space limitations, weight limitations or the like demand or justify the resultant increased cost in fuel gas.

The choice of principal gas and fuel gas to be used in practice of the present invention in differing environments has been discussed hereinabove and will be only briefly expanded upon here. If an energy converting device for producing power or heat must exhaust into a closed environment shared by human beings the present invention may utilize liquefied air as the principal gas and hydrogen as the fuel gas. Usually 4 percent or less by volume, standard pressure and temperature, of the total mixture should be hydrogen to prevent development of unduly high temperatures in the catalytic reaction. Therefore, the liquefied air should be enriched in oxygen to the extent of about 2 percent so that when all of the hydrogen combines with the stoichiometric amount of oxygen to produce water and heat the residual heated gas will be the full equivalent of fresh air mixed with a little steam. Exhausting of such a mixture, with ultimate condensation of the steam, into the atmosphere of the closed environment will place no further burden upon whatever system is used to maintain the environmental atmosphere.

A similar enriched liquid air and hydrogen system may be used to propel vehicles used in cities, for example buses, taxicabs and local delivery vehicles. In that event the exhaust from all vehicles thus propelled would tend to enhance rather than to pollute the atmosphere of the city.

In other instances where the exhaust of pure nitrogen mixed with steam, but free of what may be regarded as pollutants, is not objectionable the principal gas may be nitrogen with just enough oxygen to combine with the amount of hydrogen to be used. In such instances the liquefied gaseous materials may be supplied at such a rate as to deliver to the catalyst a gaseous mixture such as the 85 percent nitrogen, 10 percent hydrogen and 5 percent oxygen, mentioned above, which will produce about as high a temperature as may be produced with the use of currently known and commercially practicable catalytic materials. Such temperature is about 1500° F and obviously greater amounts of power thus may be produced for the propelling of vehicles such as highway trucks, off-the-road vehicles, high powered automobiles and the like.

Hydrocarbon fuels may be used as the liquefied fuel gas for admixture with almost any selected principal gas in the practice of the present invention. However, care must be exercised in the selection of such fuel and such principal gas, at least to avoid unduly rapid poisoning of the particular catalyst used. Also, of course the nature of the exhaust gas must be considered since certain combinations of gases and reaction temperatures may produce a pollutant-containing exhaust. However since the ratio between the amount of available oxygen or other oxidant and the amount of selected fuel gas, according to the present invention, may be accurately established and maintained over wide ranges of rates of supply and rates of power demand the completeness of oxidation of the fuel gas can be assured. This is because the catalytic reaction can be relied upon to proceed at a substantially steady temperature for any particular ratio and consequently by so selecting the ratio that adequate oxygen is available for complete reaction with the fuel gas at that steady temperature the exhaust gases will be made free of incompletely oxidized hydrocarbons or sulfur. The invention thus may be used in any location where the presence of $CO_2$ and $SO_2$ in the exhaust can be tolerated.

In all of FIGS. 1 through 5 the cryogenic principal and fuel gases are pumped to spray heads (26 and 42 in FIG. 1, for example) which, as illustratively shown herein, are located in a common chamber within a heat exchanger. It will be understood that no attempt has been made to show the physical construction of the heat exchanger which, as is well known in the art, ordinarily will include baffles and/or complex passageways to insure desired retention time for the finely divided liquids which are to be heated and vaporized therein. In addition to retention time the layout of the heat exchanger ordinarily will include provisions for insuring turbulent flow of the infeed materials to provide adequate mixing thereof. Also, it will be apparent that the principal gas may be pumped to one heat exchanger or chamber and the fuel gas may be pumped to a separate heat exchanger or chamber in any case where the difference in vaporization temperatures of the infeed liquefied gases may be great enough to make the use of separate chambers more safe, efficient or reliable.

When two exchangers or chambers are used the vaporized gases will be mixed in proper ratio before flowing on to the catalyst bed. It may be preferred to use two-chamber or separate heat exchangers in all embodiments of the present invention wherein the principal gas is air or other nitrogen-oxygen mixture inasmuch as liquefied hydrogen will vaporize at temperatures at which oxygen and nitrogen will remain liquid. Thus, especially with heat exchangers where some of the heat is obtained from the pressurized heated gaseous product, the hot heat exchange medium may be directed first to the exchanger in which the oxygen-nitrogen mixture is vaporized and thereafter directed to the heat exchanger in which the hydrogen is vaporized inasmuch as the heat remaining in the medium leaving the first heat exchanger will be sufficient to vaporize the hydrogen provided, of course, that sufficient time is allowed in the hydrogen heat exchanger for such residual heat to be effective.

What is claimed is:

1. In a method of producing a heated gaseous product by mixing a relatively great volume of a principal gaseous material which contains at least some oxygen with a relatively small volume of a fuel gaseous material consisting at least in part of hydrogen, in free or combined form, and passing said mixture over a catalyst to cause all of the hydrogen in said fuel gaseous material and at least some of the oxygen in said principal gaseous material to combine catalytically without ignition to form water and thus to produce heat to raise the temperature of the remainder of said mixture of principal and fuel gaseous materials, the improvement which comprises the steps of selecting as said principal gaseous material a liquefied material which can exist as a liquid only at cryogenic temperatures, pumping said principal gaseous material in the form of a liquid at a predetermined volumetric rate of flow into a zone and adding heat to said zone to vaporize said liquid principal gaseous material, selecting as said fuel gaseous material a liquefied material, pumping said liquefied fuel gaseous material in the form of a liquid fuel at a predetermined volumetric rate of flow into a zone, vaporizing said liquid fuel in the zone into which it is pumped, mixing said vaporized principal gaseous material with said vaporized fuel gaseous material, and passing said mixed vaporized gaseous materials over a catalyst for the purpose described in this claim.

2. The method of claim 1 wherein said fuel gaseous material is one which exists as a liquid only at cryogenic temperatures.

3. The method of claim 1 wherein said liquefied principal gaseous material is selected from the group consisting of air, oxygen, nitrogen, mixtures in any ratio of oxygen and nitrogen, air enriched to any extent in nitrogen, and air enriched to any extent in oxygen.

4. The method of claim 1 wherein said liquefied principal gaseous material consists of nitrogen mixed with only enough oxygen to combine catalytically with all of the hydrogen in said fuel gaseous material.

5. The method of claim 1 wherein the ratio between predetermined volumetric rate at which said principal gaseous material is pumped and said predetermined volumetric rate at which said fuel gaseous material is pumped is such that in said mixture of vaporized gaseous materials there is at least enough oxygen to combine catalytically with all of the hydrogen in said mixture when said mixture is passed over said catalyst, and which ratio is also such that the amount of hydrogen in said vaporized mixture of principal and fuel gaseous materials is insufficient to make said mixture combustible in the ordinary sense.

6. The method of claim 5 wherein said predetermined volumetric rate at which said principal gaseous material in liquid form is pumped and said predetermined volumetric rate at which said fuel gaseous material in liquid form is pumped are both varied over predetermined ranges in accordance with demand for said heated gaseous product and wherein said ratio remains fixed throughout the ranges of variations in said rates.

7. The method of claim 4 wherein the amounts of oxygen in said principal gaseous material and of hydrogen in said fuel gaseous material are such, respectively, that at the rates at which said gaseous materials are pumped in the form of liquids the mixture of gaseous materials formed will consist essentially of from about 2 ½ percent up to 10 percent hydrogen, about 1 ¼ percent up to 5 percent oxygen and about 96 ¼ percent down to 85 percent nitrogen.

* * * * *

UNITED STATES PATENT OFFICE
CERTIFICATE OF CORRECTION

Patent No. 3,692,459　　　　　　　　　Dated Sept. 19, 1972

Inventor(s) George H. Erb

It is certified that error appears in the above-identified patent and that said Letters Patent are hereby corrected as shown below:

| | | |
|---|---|---|
| Col. 1, line 56 | "mixture" should be | --mixtures-- |
| Col. 2, line 12 | "catalystic" should be | --catalytic-- |
| Col. 2, line 45 | "catalystic" should be | --catalytic-- |
| Col. 3, line 47 | "catalystic" should be | --catalytic-- |
| Col. 6, line 33 | "exchanged" should be | --exchanger-- |
| Col. 10, line 35 | "bet" should be | --bed-- |

Reference - Patent No. 3,101,592　"1968" should be　--1963--

Signed and sealed this 10th day of April 1973.

(SEAL)
Attest:

EDWARD M. FLETCHER, JR.
Attesting Officer

ROBERT GOTTSCHALK
Commissioner of Patents